(12) United States Patent
McAuley (10) Patent No.: US 7,216,581 B2
(45) Date of Patent: May 15, 2007

(54) PISTON LOCKING ACTUATOR (75) Inventor: Shawn A. McAuley, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 300 days.

(21) Appl. No.: 10/758,887

(22) Filed: Jan. 16, 2004

(65) Prior Publication Data
US 2007/0057119 A1    Mar. 15, 2007

(51) Int. Cl.
F15B 15/26 (2006.01)

(52) U.S. Cl. .................. 92/21 MR; 92/24; 91/45; 244/102 SL (58) Field of Classification Search ............ 244/110 B, 244/110, 102 SL; 92/15, 20, 23, 24, 21 R, 92/21 MR; 91/44, 45
See application file for complete search history.

(56) References Cited

U.S. PATENT DOCUMENTS

| | | | | |
|---|---|---|---|---|
| 3,107,886 A | * | 10/1963 | Bossler, Jr. ............ | 244/102 R |
| 3,180,234 A | * | 4/1965 | Crawley et al. .......... | 92/5 L |
| 3,583,288 A | * | 6/1971 | Nepp ................... | 92/25 |
| 3,813,065 A | * | 5/1974 | Hallesy et al. ........... | 244/115 |
| 4,167,891 A | * | 9/1979 | Kamimura ............... | 91/408 |
| 4,240,334 A | * | 12/1980 | Crosser ................ | 92/23 |
| 4,365,539 A | * | 12/1982 | Martin et al. ............ | 92/17 |
| 4,543,783 A | | 10/1985 | Greune et al. | |
| 4,561,527 A | | 12/1985 | Nakamoto et al. | |
| 4,586,329 A | | 5/1986 | Carlin | |
| 4,630,788 A | * | 12/1986 | Veaux et al. ........... | 244/104 FP |
| 4,714,006 A | | 12/1987 | Tootle et al. | |
| 4,987,788 A | | 1/1991 | Bausch | |
| 5,063,828 A | * | 11/1991 | Kamimura .............. | 92/26 |
| 5,184,465 A | * | 2/1993 | Howard et al. .......... | 60/403 |
| 5,280,704 A | | 1/1994 | Anderson et al. | |
| 5,349,894 A | * | 9/1994 | Greer .................. | 91/43 |
| 5,365,210 A | | 11/1994 | Hines | |
| 5,379,969 A | * | 1/1995 | Marx et al. ............. | 244/49 |
| 5,431,085 A | | 7/1995 | Geffray | |
| 5,448,884 A | | 9/1995 | Repp | |
| 5,540,138 A | * | 7/1996 | Robbins, Jr. ........... | 92/26 |
| 5,547,130 A | | 8/1996 | Davies | |
| 5,609,020 A | | 3/1997 | Jackson et al. | |
| 5,692,851 A | * | 12/1997 | Pace .................. | 403/31 |
| 5,819,527 A | | 10/1998 | Fournier | |
| 6,059,228 A | * | 5/2000 | Koizumi et al. .......... | 244/102 R |
| 6,186,047 B1 | | 2/2001 | Baruffaldi | |
| 6,286,784 B1 | | 9/2001 | Hardy et al. | |
| 6,331,091 B2 | * | 12/2001 | Cross ................. | 403/322.2 |
| 6,343,769 B1 | | 2/2002 | Davies | |
| 6,487,846 B1 | | 12/2002 | Chakkera et al. | |
| 6,832,540 B2 | * | 12/2004 | Hart .................. | 92/24 |
| 6,953,313 B2 | * | 10/2005 | Tylosky ............... | 411/389 |

\* cited by examiner

Primary Examiner—Timothy D. Collins
(74) Attorney, Agent, or Firm—Lee & Hayes, PLLC (57) ABSTRACT

A locking actuator may be locked in an extended position. A piston with a first and a second end defines a recess that originates proximate to the first end. A strut is adapted to at least partially nest within the recess and the strut is adapted to hold at least one locking mechanism proximate to a tip of the strut. The at least one locking mechanism is held by the strut. The at least one locking mechanism is adapted to move into a first position engaging the piston when the actuator is locked, and is adapted to move to a second position not engaging the piston when the actuator is unlocked.

18 Claims, 5 Drawing Sheets

PISTON LOCKING ACTUATOR

FIELD OF THE INVENTION

This invention relates generally to powered actuators, and, more specifically, to locking actuators.

BACKGROUND OF THE INVENTION

Aircraft and other vehicles and equipment commonly have powered actuators driving a wide variety of components. In aircraft, powered actuators may be utilized in connection with the aircraft engines to actuate thrust-reversing mechanisms. In some applications, it may be desirable to lock the actuator to securely hold it in a desired position.

Current piston actuators in aircraft applications typically lock the actuator in a withdrawn position as opposed to an extended position. However, space limitations or other factors may make an actuator that locks in a withdrawn position undesirable.

Therefore, it would be desirable for an actuator to lock in an extended position. However, an unmet need exists for a compact actuator that can be locked in an extended position.

SUMMARY OF THE INVENTION

Embodiments of the present invention present a locking actuator that may be locked in an extended position. Advantageously, locking actuators according to embodiments of the present invention may be used in applications where space limitations make undesirable actuators that lock in a withdrawn position. As a non-limiting example, locking actuators according to embodiments of the present invention may be well-suited to applications in thrust-reverser actuators for jet engines.

According to an embodiment of the present invention, an actuator includes a piston with a first and a second end. The piston defines a recess that originates proximate to the first end. A strut is adapted to at least partially nest within the recess, and the strut is adapted to hold at least one locking mechanism proximate to a tip of the strut. At least one locking mechanism is adapted to move into a first position engaging the piston when the actuator is locked, and is adapted to move to a second position not engaging the piston when the actuator is unlocked.

In accordance with an aspect of the invention, a shaft within the strut moves the locking mechanism between the first position and the second position.

In accordance with another aspect of the invention, the locking mechanism includes locking keys adapted to engage at least one groove internal to the piston when the actuator is locked.

In accordance with a further aspect of the invention, the locking actuator is incorporated with an aircraft engine to drive a thrust reverser.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention present a locking actuator that may be locked in an extended position. In an exemplary actuator, a piston with a first and a second end defines a recess originating proximate to the first end. A strut is adapted to at least partially nest within the recess, and the strut is adapted to hold at least one locking mechanism proximate to a tip of the strut. The at least one locking mechanism is adapted to move to a first position engaging the piston when the actuator is locked, and is adapted to move to a second position not engaging the piston when the actuator is unlocked.

Figure 1:
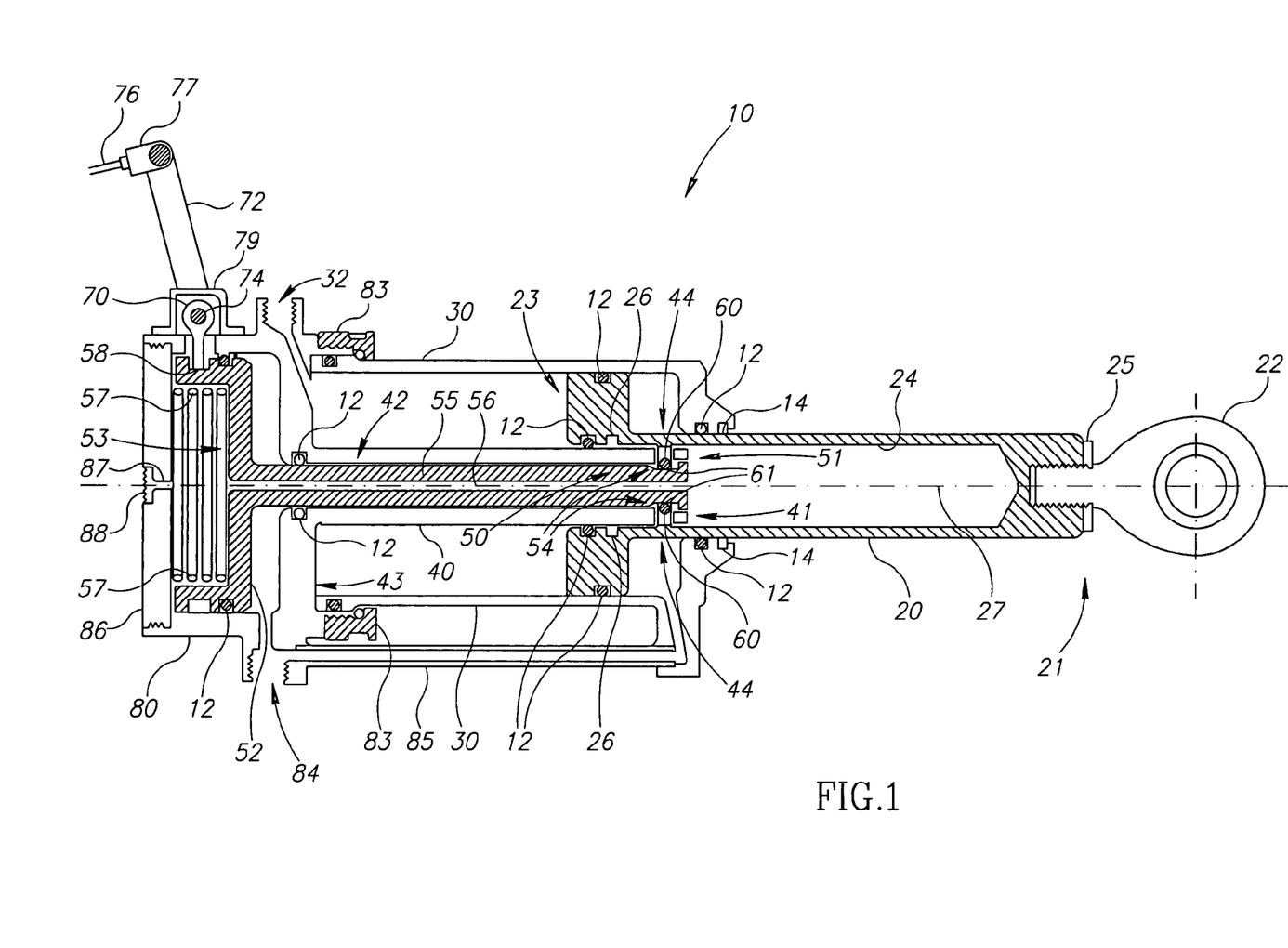
FIG. 1 is a cross section view of an exemplary locking actuator of the present invention.

Referring to FIG. 1, an exemplary locking actuator system 10 according to an embodiment of the present invention is in an extended position. A primary piston 20 has a first end 23 and a second end 21. In this example, the second end 21 is attached to a spherical rod end 22 adapted to attach to a component or mechanism (not shown) to be driven by the system 10. The rod end 22 is locked into the piston with a jam nut 25. The piston 20 defines a recess 24 projecting within the piston 20 from the first end 23 along a longitudinal axis 27 of the piston 20 towards the second end 21. The recess 24 is sized to permit a strut 40 holding a locking mechanism 50 proximate to the tip of the strut 40 to substantially nest within the recess 24.

The piston 20 suitably is hydraulically driven. Hydraulic pressure is suitably applied to the first end 23 of the piston 20. A first hydraulic cylinder 30 surrounds the first end 23. The interface between the first end 23 and the cylinder 30 is sealed with a plurality of hydraulic seals 12. A scraper 14 also surrounds the piston 20 at where it exits the cylinder 30. The scraper 14 removes foreign debris from the piston 20. The scraper 14 thus helps to protect the seals 12 from failure caused by foreign materials as the piston 30 moves in and out from the cylinder 30. The cylinder 30 in this exemplary embodiment has two hydraulic feeds. An extend hydraulic feed 32 provides hydraulic pressure to extend the piston 20 from the cylinder 30 and a withdraw and unlock hydraulic feed 84 provides hydraulic pressure to withdraw the piston 20 within the cylinder 30.

When the piston 20 is substantially withdrawn into the cylinder 30, the strut 40 substantially nests within the recess 24. When the piston 20 is extended from the cylinder 30, the strut 40 partially nests within the piston 20. When the piston 20 is in a withdrawn position (not shown), the strut 40 nests within the recess 24 substantially parallel with the axis 27. In that position, a tip 41 of the strut 40 projects into the recess 24 to near the second end 21 (still internal to the piston 20). Hydraulic seals 12 provide a hydraulic seal between the piston 20 and the strut 40 proximal to the first end 23.

By way of example and not limitation, the strut 40 has a base 43 that supports the strut 40 within the piston 20 such that the tip 41 is within the recess 24. The strut 40 holds a locking mechanism 50 near its tip 41. In this exemplary embodiment, the locking mechanism 50 includes locking keys 60 that engage key slots or a groove 26 within the piston 20 and extending outward from the recess 24 substantially perpendicular to the longitudinal axis 27. Locking keys 60 are held by and project through keyways 44 in the strut 40 near its tip 41.

As will be described in further detail with respect to FIGS. 2A and 2B below, the keys 60 extend into the groove 26 in the piston 20 when the system 10 is locked. It will be appreciated with the locking keys 60 held proximal to the tip 41 and the groove 26 proximal to the first end 23 that the system 10 can suitably lock with the piston 20 in an extended position, that is with the strut 40 only partially nested within the piston 20. It will be appreciated that additional sets of grooves 26 suitably may provide for the system 10 to be locked with the piston 20 in other extended positions.

By way of example but not limitation, the locking keys 60 are moved into the groove 26 by a lock/unlock shaft 55 movably held within a bore 42 through the center of the strut 40. The shaft 55 extends through the strut 40 from the base 43 to the tip 41 of the strut 40 with a head 51 of the shaft 55 proximate to the tip 41 of the strut 40. A foot 53 of the shaft 50 extends out of the base 43 of the strut 40. Seals 12 suitably seal the interface between the shaft 55 and the strut 40 near the base 43, where the shaft enters the bore 42.

The head 51 of the shaft 55 is adapted to drive the locking mechanism 50. In this embodiment, the head 51 includes a ramp 54 that pushes the locking keys 60 into the groove 26 when the system 10 is locked, as will be described further with reference to FIGS. 2A and 2B below. The shaft 55 may be operated by any suitable driving mechanism including but not limited to spring activation, hydraulic activation or manual activation. In this exemplary system 10, the foot 53 defines a hydraulic locking piston 52 that, when hydraulically driven, moves the shaft 55, thereby disengaging the locking mechanism 50. The locking piston is biased towards a locked position by a coil spring 57.

The locking piston 52 suitably is enclosed in a second hydraulic cylinder or body 80. In this embodiment the body 80 is an extension of the base 43 of the strut 40. The interface between the locking piston 52 and the body 80 is suitably sealed with hydraulic seals 12. The body 80 through an end cap 86 also holds the locking spring 57 biasing the locking piston 52 and hence the shaft 55 in a locking position. A withdraw and unlock hydraulic feed 84 through the body 80 suitably provides hydraulic pressure to move the locking piston 52 and the attached shaft 55 into an unlocking position. It will be appreciated that the locking spring 57 biasing the locking piston 52 towards the tip 41 of the strut 40 pushes the shaft 55 within the strut 40 towards the tip 41 of the strut 40. This pushing causes the ramp 54 to push the locking keys 60 into the groove 26 in the piston 20, thereby locking the system 10. By way of example, but not limitation, the withdraw and unlock hydraulic feed 84 provides hydraulic pressure (not shown) that both moves the shaft 55 into an unlocked position (pushing against the biasing effect of the locking spring 57) and withdraws the piston 20 (by applying withdrawing pressure to the first end 23 of the piston 20). A supply tube 85 provides a link between the withdraw and unlock hydraulic feed 84 located on the body 80 surrounding the locking piston 53 and the cylinder 30 surrounding the primary piston 20. In this exemplary embodiment, the cylinder 30 and the body 80 are held together with a spanner nut 83.

The locking spring 57 is held in place against the locking piston 52 by the end cap 86 threadedly connected into the body 80 surrounding the locking piston 52. The end cap 86 is vented with a vent hole 87 covered with a protective screen 88. The shaft 55 is also vented with a vent passage 56 that suitably is bored down the center of the shaft 55. The hole 87 and passage 56 suitably vent air to and from the recess 24 within the piston 20, and the foot 53 of the lock/unlock shaft 55 encompassing the locking spring 57, reducing any vacuum or pressure build up which may impede movement of the piston 20 and/or the shaft 55.

Withdrawing the locking piston 52 with hydraulic pressure pulls back the shaft 55 within the strut 40 thereby permitting the ramp 54 to release the locking keys 60. This pulling permits the keys 60 to fall away or be withdrawn from the groove 26. In this exemplary embodiment, by way of example, but not limitation, a ring spring 61 suitably biases the keys 60 inward in a released position. Absent hydraulic pressure withdrawing the locking piston 52, the locking spring 52 biases the locking piston 52 and attached shaft 55 towards the tip 41 of the strut with the result that the keys 60 are affirmatively held outward in a locked position by the ramp 54.

The system 10 can, by way of example but not limitation, include alternate mechanisms for locking or unlocking the piston 20. For example, the foot 53 of the shaft 55 defines a pawl slot 58 along a side of the locking piston 52. An oblong pawl 70 extends through the body 80 into the pawl slot 58. Moving the pawl 70 suitably moves the shaft 55 towards the tip 41 and away from the tip 41, thus engaging and disengaging the locking mechanism 50. In this example, the pawl 70 is held on a pivot 74 proximate to the body 80 by a pawl housing 79. The pawl 70 is driven by a lever 72 linked to the pawl 73 through the pivot 74. The lever 72 suitably is activated by hand through a clevis 77 linked to a pushrod 76. Thus, it will be appreciated that the system 10 may be unlocked manually using the pawl 70 to move the shaft 55. It will be appreciated that a variety of driving mechanisms may be utilized to move the shaft 55. By way of example but not limitation, the shaft 55 may be driven by a solenoid and by manual operation, or through other combinations of one or more driving mechanisms or biasing springs.

It will also be appreciated that the piston 20, itself, may also be driven by a variety of mechanisms. By way of example but not limitation, an electric helical ball drive suitably may extend or withdraw the piston 20 by driving the first end 23. The strut 40 still nests within the recess 24 when the piston 20 is withdrawn and only partially nests within the recess 24 when the piston 20 is in an extended position, with the locking mechanism 50 internal to the piston 20.

Figure 2A:
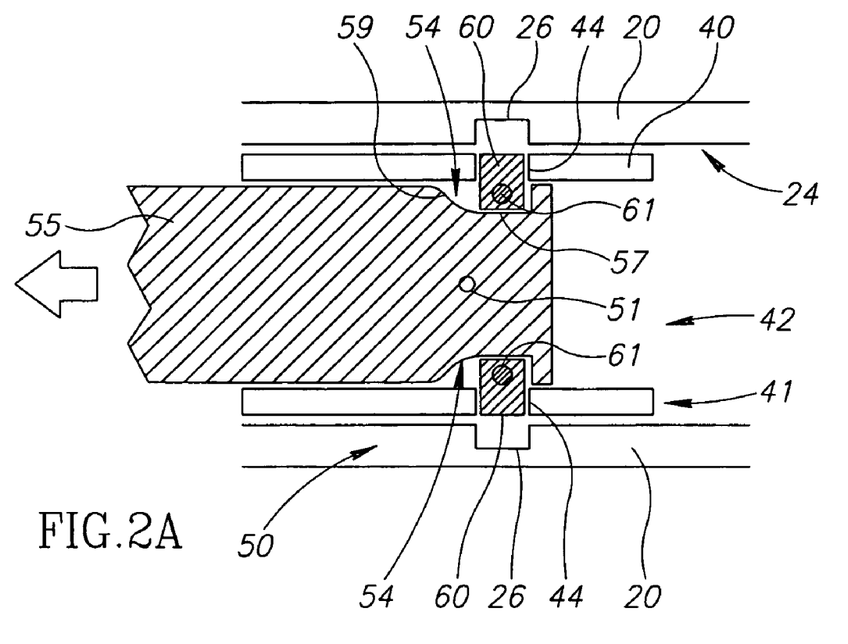
FIG. 2A is a cross section view of an exemplary strut and locking keys in an unlocked position in an exemplary locking actuator of the present invention.
Figure 2B:
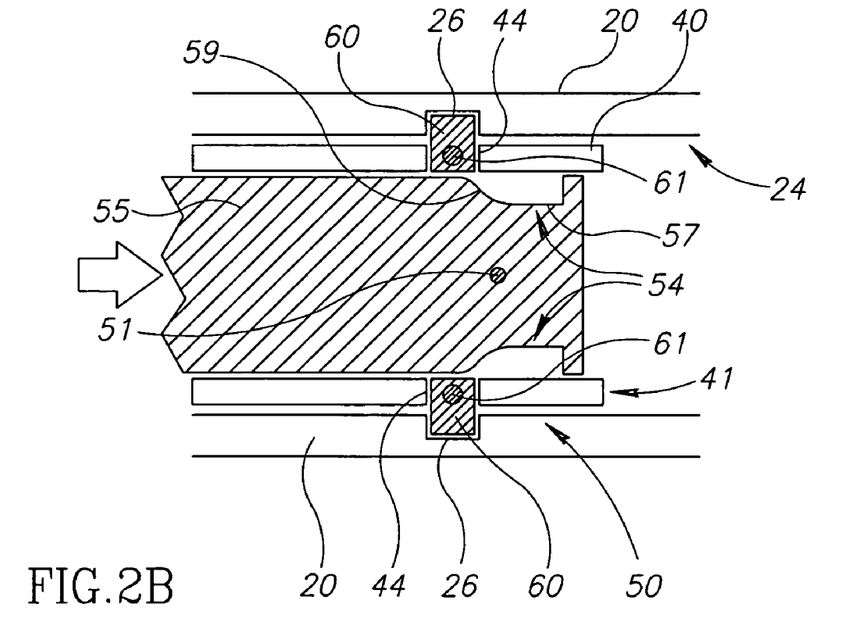
FIG. 2B is a cross section view of an exemplary strut and locking keys in a locked position in an exemplary locking actuator of the present invention.

FIG. 2A shows the locking mechanism 50 of FIG. 1 in an unlocked configuration and FIG. 2B shows the locking mechanism 50 of FIG. 1 in a locked configuration. Both FIGS. 2A and 2B show the strut 40 in the area of the groove 26. The groove 26 are adapted to accept the locking keys 60 when the locking mechanism 50 is engaged. In FIGS. 2A and 2B, the strut 40 encloses the shaft 55. Moving the shaft 55 within the strut 40 towards and away from the tip 41 of the strut 40 pushes the keys 60 into the groove 26 by moving the keys 60 along the ramp 54.

In FIG. 2A, the locking shaft 55 is withdrawn to a position away from the tip 41. The ramp 54 has a low end 57 and a high end 59. In a withdrawn position of the shaft 55, the locking keys 60 are proximate to and rest against the low end 57. In this configuration, the locking keys 60 nest substantially within the keyways 44 and do not project into or engage in the groove 26. The ramp 54 in this embodiment thus forms a tapered section around the shaft 55. The low end 57 of the ramp 54 forms a narrower portion of the shaft 55 than does the high end 59. In this example, the low end 57 is closer to the tip 41 than the high end 59. Thus, the locking keys 60 are not pushed into the groove 26 by the ramp 54 when the shaft 55 is withdrawn from the tip 41. A ring spring 61 aids in withdrawing the keys 60 from the groove 26 when the shaft 55 is withdrawn. The keys 60 are pushed into the groove 26 when the shaft 55 is projected further into the strut 40 towards its tip 41. As the shaft 55 is moved toward the tip 41, the keys 60 ride up the ramp 54 progressively extending into the groove 26 in the surrounding piston 20. The keys 60 are then proximate to and resting against the high end 59 of the ramp 54. It will be appreciated that the keys 60 contact the inside of the piston 20, a non-hydraulic pressure bearing surface. Thus, incidental wear from the keys 60 will not affect the hydraulic integrity of the actuator system 10.

It will be appreciated that the ramp 54 suitably may be reversed with respect to the shaft 40. In this case, the keys 60 are pushed into the groove 26 by the shaft 55 when the shaft 55 is withdrawn away from the tip 41 of the strut 40, and vice versa (conversely to the directions shown in FIGS. 2A and 2B). It will also be appreciated that a variety of the configurations of the ramp 54 may be utilized or alternative mechanisms may be used to move the keys 60. By way of example but not limitation, ramps configured circumferentially around the shaft 55 suitably may push the keys 60 into the slots 26 when the shaft 55 is rotated.

Referring to FIG. 2B, the locking shaft 55 is in a locking position with its head 51 extended towards the tip 41 of the strut 40. This places the locking keys 60 over the upper end 59 of the ramp 54. The locking keys 60 are thus held projecting through the keyways 44 into the groove 26. The ring spring 61 is stretched in this configuration, ready to contract and withdraw the keys 60 when the shaft 55 is later moved into an unlock position.

In the locked position, the keys 60 fit snugly within the groove 26 and the keyways 44, thereby holding the piston 20 and the strut 40 in a fixed position with respect to each other. It will be appreciated that compressing the system 10 places the keys 60 in sheer. Thus, the keys 60 suitably are sized to safely maintain any desired loadings on the piston 20. Similarly, the strut 40 is sized to support the keys 60 in a locked position when the piston 20 is under stress.

Figure 3A:
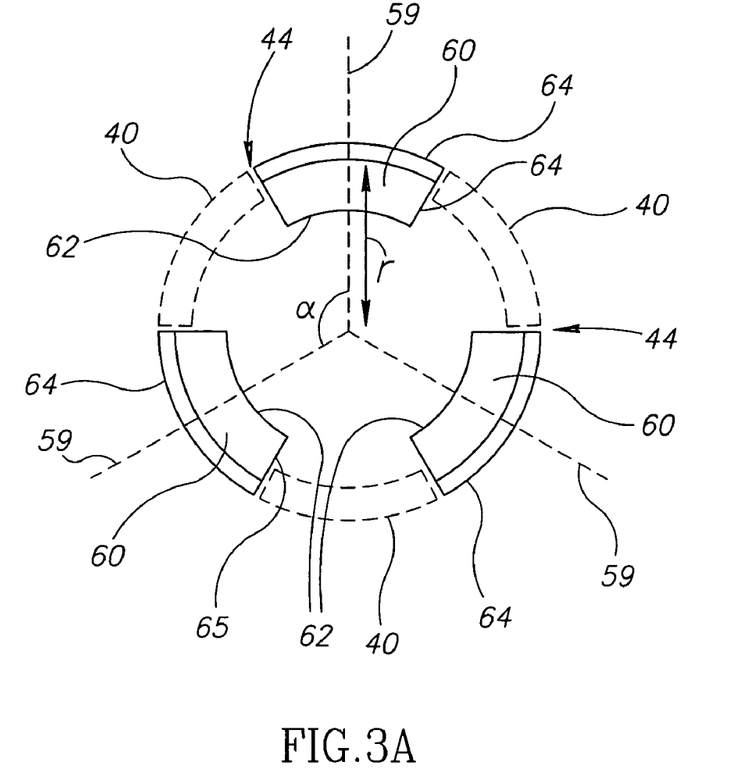
FIG. 3A is an end view of the configuration of three exemplary locking keys of the present invention.
Figure 3B:
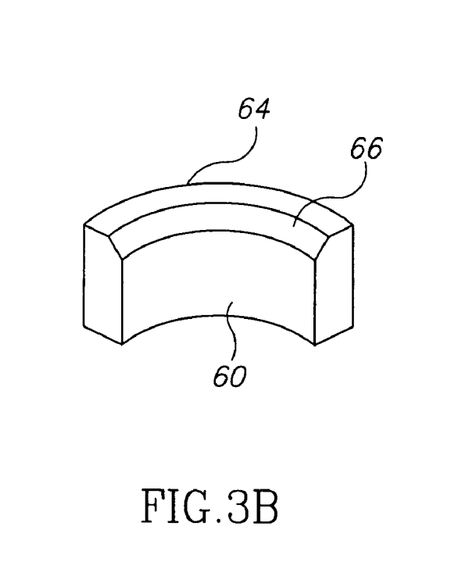
FIG. 3B is a perspective view of an exemplary locking key of the present invention.
Figure 3C:
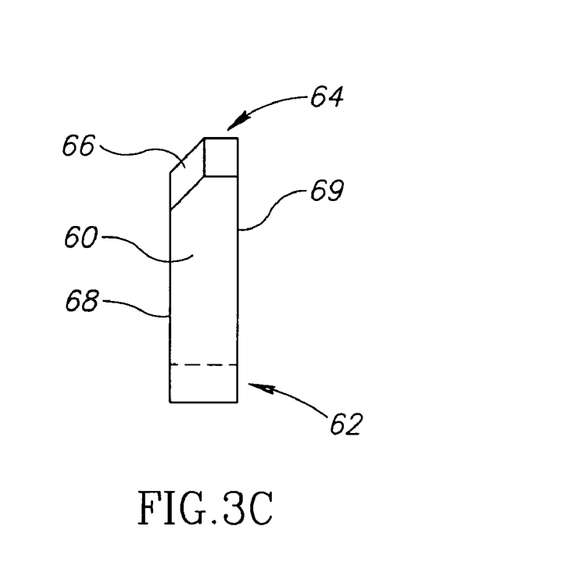
FIG. 3C is a side view of an exemplary locking key of the present invention.

FIGS. 3A, 3B and 3C are alternate views of exemplary locking keys 60. An end view of the key 60 is shown in FIG. 3A. In this configuration, the system 10 (not shown) includes three locking keys 60 held at least partially within the strut 40 (shown in phantom). Three key centerlines 59 are radially aligned around the circumference of the strut 40 with an angle α of around 120 degrees between them. In this end view, the three keys 60 have shapes similar to cut segments from a washer with an inner-radius 62 and outer-radius 64 and sides 65. The sides 65 slidably fit within the keyway 44. Referring briefly back to FIG. 2A, the keys 60 are shown in the withdrawn position, and the key 60 with the outer-radius 64 has the same radius as the strut 40. With the keys 60 in the withdrawn position, their outer-radius 64 matches that of the strut 40. Thus, the keys 60 do not engage the surrounding piston (not shown). The ring spring 61 is not shown.

Referring to FIG. 3B, a chamfer 66 along the outer-radius 64 or edge of the key 60 may be incorporated into the keys 60 to aid disengaging the keys 60 from the groove 26 in the piston (not shown) when the ramp 54 moves underneath the keys 60, thereby releasing them from the groove in the piston (not shown). Referring now to FIG. 3C, a champher 66 is made in the key 60 along the outer-radius 64. The key 60 in side view suitably is substantially rectangular in shape and has a flat front 68 and a flat back 69 that are parallel to each other, thereby permitting the key 60 to slide within the keyway 44 (not shown).

Returning to FIGS. 1, 2A and 2B, as well, the operation of the exemplary locking actuator system 10 can thus be summarized. In a typical static state, the primary piston 20 is extended. The locking shaft 55 is biased by the locking spring 57 towards the tip 41 of the strut 40 within the first end 23 of the piston 20. The high end 59 of the ramp 54 holds the locking keys 60 through and extended from the keyways 44 in the strut 40 into the groove 26 in the piston 20, locking the piston 20 in the extended position. In this embodiment, the piston 20 remains locked even in the absence of hydraulic pressure.

In a retract operation, hydraulic pressure is applied or increased to the unlock and withdraw hydraulic feed 84, and released or decreased from the extend hydraulic feed 32. The unlock piston 52 is pressured against the locking spring 57, and the shaft 55 partially withdraws from the strut 40. The low end 57 of the ramp 54 moves under the locking keys 60 and they are withdrawn from the groove 26 into the strut 40 by the ring spring 61. The piston 20 is now unlocked. Hydraulic pressure from the unlock and withdraw feed 84 is also fed by a supply tube 85 to the cylinder 30 surrounding the primary piston 20, driving the piston 20 to withdraw. Hydraulic fluid exits from near the tail 23 of the piston 20 as the piston 20 withdraws through the extend hydraulic feed 32. The actuator is now retracted, but in this embodiment is not locked in a retracted position.

In an extend operation, hydraulic pressure is applied or increased to the extend hydraulic feed 32, and released or decreased from the unlock and withdraw hydraulic feed 84. Hydraulic pressure applied to the tail 23 of the piston 20 causes the piston 20 to extend. Hydraulic pressure released from the unlock and withdraw feed 84 permits the locking spring 57 to again bias the locking shaft 55 towards the tip 41 of the strut 40, with the result that the ramp 54 biases the locking keys 60 outward, to be ready to move into the groove 26 when the piston 20 is in the extended position. As the piston 20 moves into the extended position by hydraulic pressure from the extend hydraulic feed 32, the keys 60 indeed move into the groove 26, and the piston 20 is again locked in the extended position.

In the event hydraulic pressure is not available, the system 10 may be suitably unlocked and operated manually, using the unlocking lever 72 driving the unlocking pawl 70. Hydraulic pressure is bled off (not shown), and the pawl 70 is moved by the lever 72, manually driving the locking piston 52 against the locking spring 57. This moves the shaft 55 to an unlocked position, and the ring spring 61 pulls the locking keys 60 from the groove 26. The piston 20, is thus unlocked, and with hydraulic pressure bled off may be withdrawn manually.

Figure 4A:
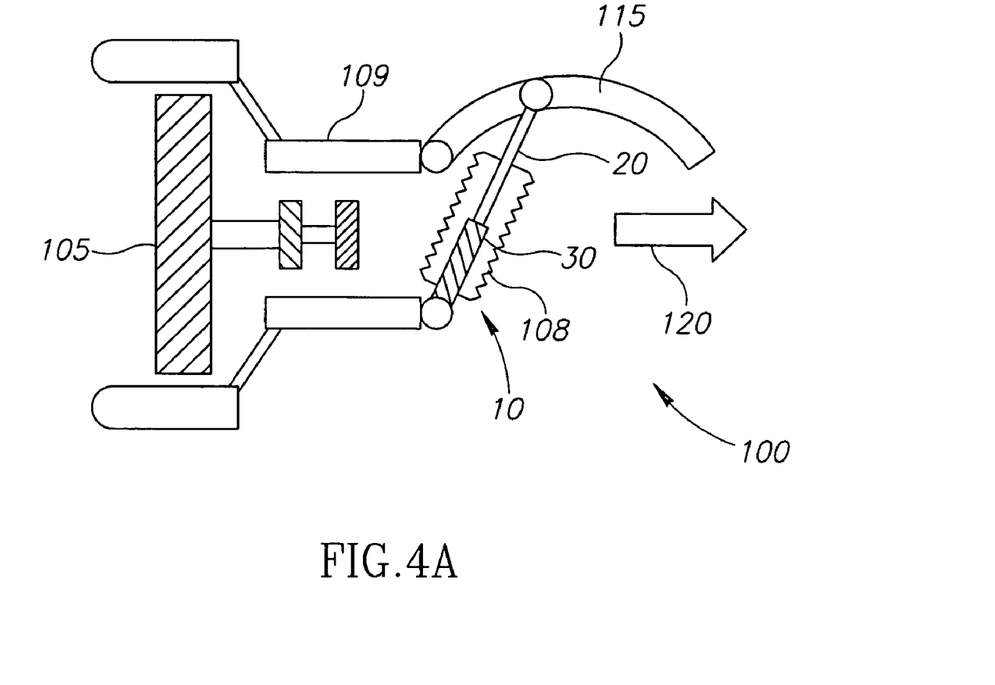
FIG. 4A is a cross section view of an aircraft engine incorporating an exemplary locking actuator of the present invention driving a thrust reverser in the forward thrust position.
Figure 4B:
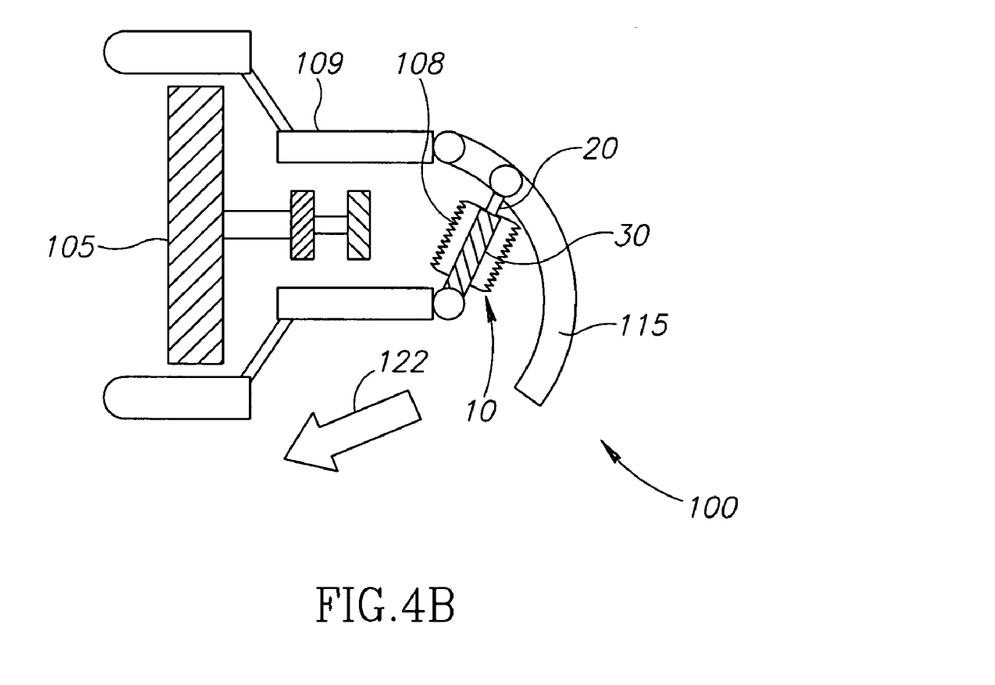
FIG. 4B is a cross section view of an aircraft engine incorporating an exemplary locking actuator of the present invention driving a thrust reverser in the reverse thrust position.

Referring now to FIGS. 4A and 4B, an exemplary locking actuator 10 of the present invention is advantageously incorporated into a thrust reverser of a turbine engine 100 of an aircraft (not shown). FIG. 4A shows a thrust deflector 115 in a forward thrust position; while FIG. 4B shows the thrust deflector 115 in a reverse thrust position. In both FIGS. 4A and 4B, the engine 100 includes a body 109 and a turbine 105 for providing thrust. The curved thrust deflector 115 is linked to the body 9 of the engine 100. In FIG. 4A, the thrust deflector 115 is held out of the airflow from the engine 100 by the locking actuator 10 extended with its piston 20 extended from its cylinder 30. The actuator 10 in the extended position bridges the forward thrust flow 120 with the cylinder 30 linked to one side of the body 9, while the piston 20 is linked to the thrust deflector 115 on an opposite side of the body 9. When the actuator 10 is extended, the thrust deflector 115 is held out of the forward thrust flow 120. When the actuator 10 is withdrawn, the actuator 10 pulls the thrust deflector 115 into the thrust flow 120. To protect the actuator 10, the piston 20 and the cylinder 30 suitably are surrounded by a metal bellows 108. In the extended position, the actuator 10 is locked in flight for safety reasons, thereby holding the thrust deflector 115 out of the forward thrust flow 120.

In FIG. 4B, the engine 100 is shown with the thrust deflector 115 deployed, thereby resulting in a reversed thrust flow 122. The thrust deflector 115 is pulled in the output flow of the engine 100 by the actuator 10 when the piston 20 is withdrawn into the cylinder 30. The bellows 108 contract with retraction of the piston 20 into the cylinder 30. It will be appreciated that a thrust reverser utilizing a locking actuator 10 of the present invention may have an engine nacelle (not shown) surrounding the engine 100 that is smaller than nacelles covering engines with other thrust reverser actuators. This is because the thrust reverser actuator 10 suitably may be positioned substantially within the engine 100 itself.

Figure 5:
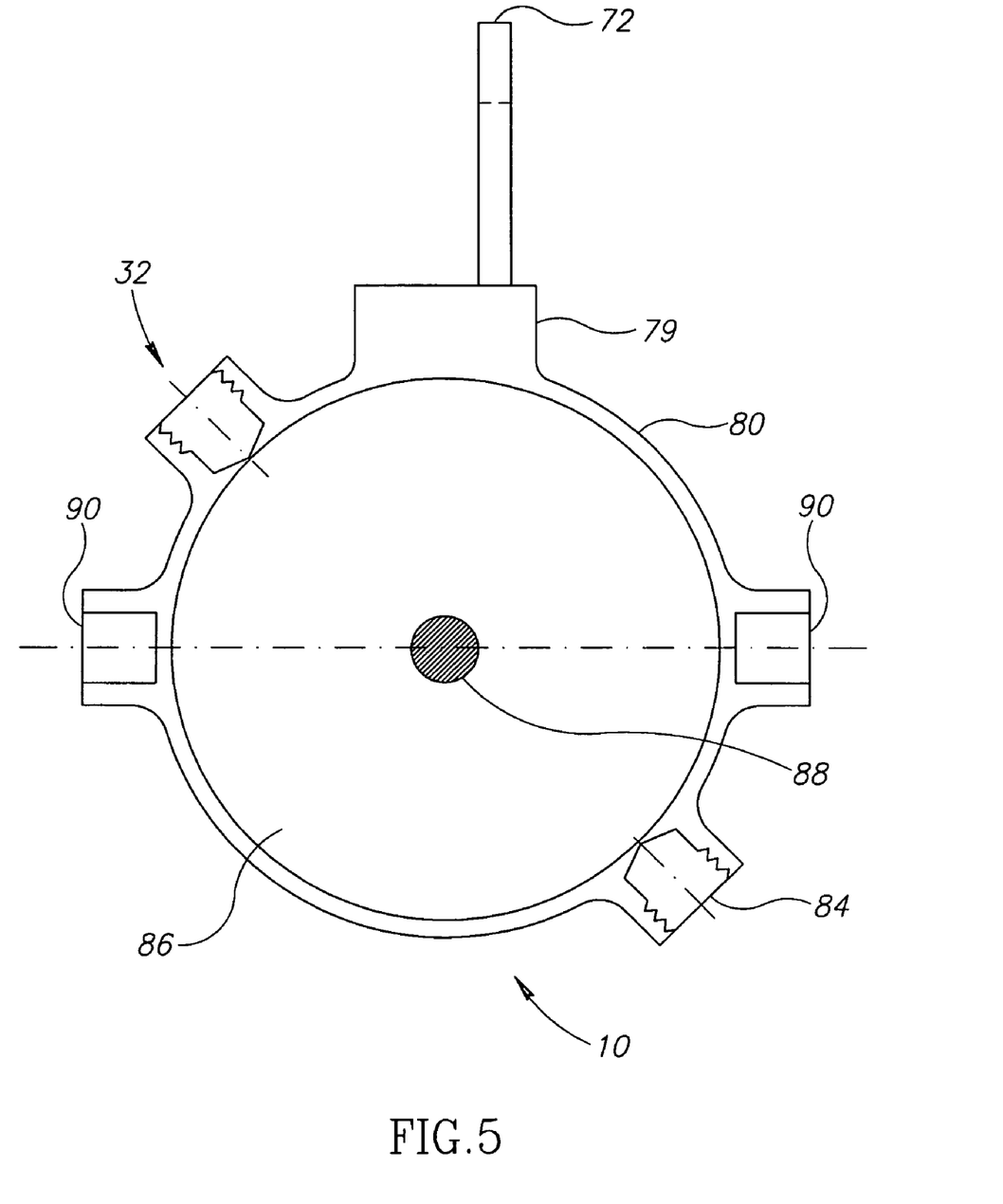
FIG. 5 is an end view of an exemplary locking actuator of the present invention.

In FIG. 5, an exemplary mounting configuration is shown for the locking actuator system 10 of FIG. 1. FIG. 5 is a rear end view of the system 10, away from the primary piston 20 (not shown) showing the end cap 86 with its vent screen 88 mounted within the body 80. Projecting outward from upper and lower portions of the body 80 respectively are the extend hydraulic feed 32 and the unlock and withdraw hydraulic feed 84. Also projecting outward from an upper portion of the body 80 are the locking pawl housing 79 and the manual unlocking lever 72. Projecting out laterally from the right and left sides of the body 80 are trunion mounts 90 that suitably hold the system 10, while permitting the system 10 to pivot. In this example the trunion mounts 90 are suitably configured as sockets to receive mounting bars or pins (not shown).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A locking actuator comprising:
    a piston configured to be moved by a drive mechanism, the piston having a first end and a second end, the second end being configured to link to an apparatus to be driven by the actuator, the piston defining a recess originating proximal the first end;
    a strut having a base and a tip, the strut configured to at least partially nest within the recess, the strut configured to hold at least one locking mechanism proximal to the tip;
    at least one locking mechanism held by the strut, the at least one locking mechanism configured to move into a first position engaging the piston when the actuator is locked and configured to move to a second position not engaging the piston when the actuator is unlocked; and
    a shaft movably held within the strut, the shaft extending from proximal the base of the strut to proximal the tip of the strut, the shaft being configured to move the at least one locking mechanism between the first position and the second position.

2. The locking actuator of claim 1, wherein the drive mechanism includes a first hydraulically pressurized cylinder adapted to move the piston.

3. The locking actuator of claim 1, wherein the locking mechanism includes at least one locking key adapted to engage the piston when the actuator is locked.

4. The locking actuator of claim 1, wherein the locking mechanism engages the piston when the piston is in an extended position.

5. The locking actuator of claim 1, further comprising a shaft movably held within the strut, the shaft being adapted to move the locking mechanism between the first position and the second position.

6. The locking actuator of claim 5, wherein the shaft defines a ramp proximal the tip of the strut, the ramp being adapted to move the locking mechanism between the first position and the second position.

7. The locking actuator of claim 5, further comprising a second hydraulically pressurized cylinder linked to the shaft, the second hydraulic cylinder being arranged to move the shaft within the strut, such that the at least one locking key is moved between the first position and the second position.

8. The locking actuator of claim 5, further comprising a spring arranged to bias the shaft, the spring being arranged to move the shaft within the strut, such that the at least one locking key is moved between the first position and the second position.

9. A locking actuator comprising:
    a piston having a longitudinal axis with a first length, the piston having a first end and a second end, the first end being adapted to be moved by a drive mechanism and the second end being adapted to link to an apparatus to be driven by the actuator, the piston defining a recess originating at the first end and extending along the longitudinal axis, the recess having a second length less than or equal to the first length, the piston further defining at least one groove projecting from the recess into the piston approximately perpendicular to the longitudinal axis, the at least one groove located proximal to the first end;
    a strut having a base and a tip, the strut being adapted to project into the recess, the strut being adapted to movably hold at least one locking key proximal to the tip;
    at least one locking key movably held by the strut, the at least one locking key being adapted to move into a first position engaging the at least one groove when the actuator is locked and adapted to move to a second position not engaging the at least one groove when the actuator is unlocked; and a shaft movably held within the strut, the shaft extending from proximal the base of the strut to proximal the tip of the strut, the shaft being adapted to move the at least one locking key between the first position and the second position.

10. The locking actuator of claim 9, wherein the drive mechanism includes a first hydraulically pressurized cylinder surrounding the first end.

11. The locking actuator of claim 9, wherein the shaft defines a ramp proximal the tip of the strut, the ramp being adapted to move the at least one locking key between the first position and the second position.

12. The locking actuator of claim 11, wherein the ramp includes a top and a bottom, the top being adapted to hold the at least one locking key in the at least one groove when the locking key is in the second position.

13. The locking actuator of claim 9, further comprising a lever linked to the shaft, the lever being arranged to move the shaft within the strut, such that the at least one locking key is moved between the first position and the second position.

14. The locking actuator of claim 9, further comprising:
a second hydraulic cylinder linked to the shaft, the second hydraulic cylinder arranged to move the shaft within the strut, such that the at least one locking key is moved between the first position and the second position.

15. The locking actuator of claim 9, further comprising:
a spring arranged to bias the shaft, the spring arranged to move the shaft within the strut, such that the at least one locking key is moved between the first position and the second position.

16. A locking actuator comprising:
a piston having a first end and a second end, the second end being adapted to link to an apparatus to be driven by the actuator, the piston defining a recess originating proximal the first end;
a strut having a base and a tip, the strut adapted to at least partially nest within the recess, the strut adapted to hold at least one locking mechanism proximal to the tip;
at least one locking mechanism held by the strut, the at least one locking mechanism adapted to move into a first position when the actuator is locked and adapted to move to a second position when the actuator is unlocked;
a shaft movably held within the strut, the shaft extending from proximal the base of the strut to proximal the tip of the strut, the shaft being adapted to move the at least one locking key between the first position and the second position; and
a lever linked to the shaft, the lever being arranged to move the shaft within the strut, such that the at least one locking key is moved between the first position and the second position.

17. The locking actuator of claim 16, wherein the shaft defines a ramp proximal the tip of the strut, the ramp being adapted to move the at least one locking key between the first position and the second position.

18. The locking actuator of claim 17, wherein the ramp includes a top and a bottom, the top being adapted to hold the at least one locking key in the at least one groove when the locking key is in the second position.

* * * * *